Figure 1:
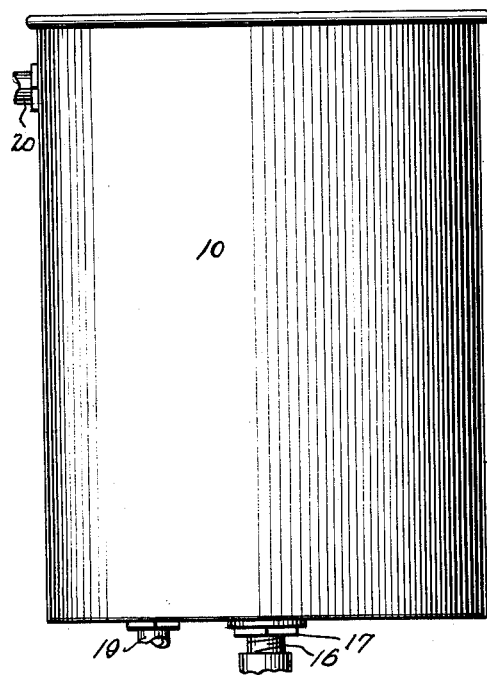

July 1, 1930.  C. M. LANCASTER  1,768,916

MILK COOLER

Filed Aug. 13, 1928

INVENTOR.
CLYDE M. LANCASTER.
BY Jack A. Schley
ATTORNEY.

Patented July 1, 1930

1,768,916

UNITED STATES PATENT OFFICE

CLYDE M. LANCASTER, OF NEAR WACO, TEXAS

MILK COOLER

Application filed August 13, 1928. Serial No. 299,277.

This invention relates to a milk cooler in which the liquid is flowed over a temperature reducing surface and comprises a continuation in part of my application filed March 22, 1927, Serial No. 177,321.

In the art of milk cooling it is most desirable to pass the liquid slowly over a continuous corrugated surface or drum subjected to a temperature controlling medium, and for that purpose the milk receptacle should be supported in spaced relation to the wall of the refrigerant tank to expose the maximum of surface for heat exchange. After each use of such an apparatus the parts must be separated and cleansed to remove all traces of the milk as required in proper dairy practice. It therefore becomes important to detachably support the milk receptacle from the base of the tank at its single outlet point and to merge the corrugated wall of the tubular drum into a funnel communicating with such outlet.

In the use of either a heating or cooling medium for the liquid it is particularly desirable to avoid radiation and variation of temperature at the outer wall of the containing tank, and for that purpose the liquid tank is disposed in spaced relation to an outer tank and the intermediate space filling with a non-conducting material which effects a material economy in refrigeration. These tanks are detachably connected at the milk outlet by a threaded collar carrying a clamp nut to engage the outer tank and a detachable interior connection for the discharge from the milk receptacle.

It has further been found desirable to provide the receptacle wall with serpentine corrugations of material depth and to merge the lower portion thereof into a conical funnel carrying an outlet connection which provides the support for the milk receptacle. The feed to such corrugations is best effected by a pan having a series of apertures alined with the uppermost corrugation to produce a very slow flow or feed of the milk which follows the corrugations of the drum, and a continuous cooling action is thus accomplished. The pan excludes air and dust from the milk during such flow, while the parts being simple and readily detachable for cleansing, provides for superior sanitation and economy in construction.

The invention has for an object to provide a novel and improved construction of milk treating device wherein the tank containing the temperature controlling agent has detachably mounted therein a corrugated milk receptacle having its lower portion merged into a discharge provided with an outlet pipe extending through the base of the tank and forming the support for the receptacle.

A further object of the invention is to present a new structure of milk cooler including a tank for a cooling medium, a corrugated drum detachably supported therein at its outlet connection with the tank, means for slowly directing milk into contact with the upper corrugation, an outer tank spaced from the cooling tank, and an insulating packing intermediate said tanks.

Another object of the invention is to provide a cooling unit comprising a drum having serpentine circumferential corrugations merging at their lower portion into a conical funnel which terminates in an outlet connection forming the support for the unit.

A construction designed to carry out the invention will be hereinafter described, together with other features of the invention.

Figure 2:
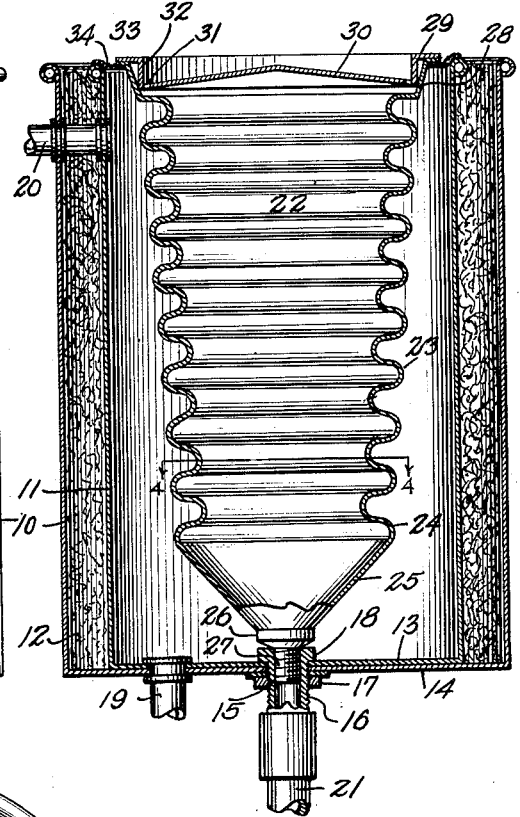
Figure 3:
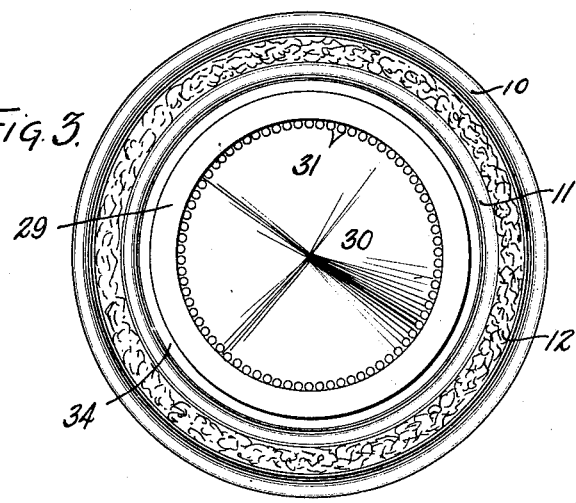
Figure 4:
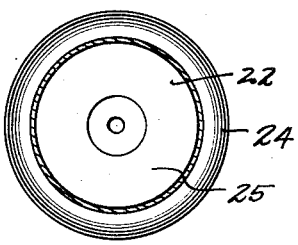

The invention will be more readily understood from a reading of the following specification and by reference to the accompanying drawings in which an example of the invention is shown, and wherein:

Fig. 1 is an elevation,
Fig. 2 is a vertical section,
Fig. 3 is a top plan, and
Fig. 4 is a section on the line 4—4 of Fig. 2.

Like numerals refer to like parts in the several figures of the drawing.

The numeral 10 designates an outer tank which may be of any desired size or configuration, and spaced therefrom a separable inner tank 11 is provided. The space between the side walls of these tanks is filled with an insulating packing, such as cork 12, to retain the temperature of the contents of the inner tank, which when used for refrigerating purposes would comprise a brine mixture.

The base 13 of the inner tank contacts with the base 14 of the outer tank 10 and they are detachably secured together by a collar 15 passing through apertures in the bases of the tanks and exteriorly threaded at 16 to receive a clamp nut 17 which cooperates with the flange 18 at the inner end of the collar to secure the tanks together while permitting their ready separation when desired. The bases of the tanks are provided with an inlet connection 19 for the temperature controlling liquid to be supplied and the side walls of such tanks have an outlet pipe 20 connecting the same to permit circulation of such liquid through the inner tank. The collar 15 may be coupled to a milk conducting pipe 21, if found desirable.

The milk receptacle or drum 22 has its body formed with relatively deep serpentine corrugations 23 and decreases in diameter downwardly so as to present the greatest surface area at the upper portion of the tank and a less area at the lower portion where the refrigerant liquid enters.

This lower portion 24 merges into a conical funnel 25 which terminates in an outlet connection 26 detachably threaded at 27 into the collar 15 and thus forming the sole support for the milk receptacle within the tank and permitting the greatest possible surface contact thereof with the liquid within the tank. The upper end of the corrugated body is formed with a seat 28 adapted to receive a pan 29 having a convex bottom 30 apertured at its junction 31 with the vertical wall 32 which is formed with an angular supporting flange 33. A flange 34 is extended from the seat 28 and rests on the top of the inner tank to protect the refrigerant and prevent loss thereof by evaporation.

While the invention has been described as a milk cooler, other liquids may be treated therein, and likewise the construction may be used for heating purpose when such a medium is introduced into the inner tank to contact with the corrugated body. It is particularly important that this body should be readily removable for cleaning purposes after each operation to prevent development of any bacteria which would affect a subsequent milk supply. The construction is simple and economically manufactured, while it provides for superior sanitation and conservation in refrigeration.

The provision of the relatively deep corrugations having their inner curves disposed to deliver to each other effects more than a mere flow of the milk, but permits an excess of milk to drip from one corrugation to the corrugation next below which separates and exposes the milk globules to effect a more rapid reduction in the temperature thereof necessary to maintain a continuous feed of the milk.

Various changes in the size and shape of the different parts, as well as modifications and alterations, may be made within the scope of the appended claims.

What I claim, is:

1. A milk treating device comprising a tank adapted to contain a temperature controlling agent, a stationary receptacle within the tank having a heat conducting wall and a reduced lower portion merging therefrom into an outlet connection, an open pan forming a cover for the receptacle and having its bottom formed with peripheral outlets for feeding a liquid into contact with the inner surface of the receptacle, and means at the base of the tank for detachably receiving said outlet pipe to support the receptacle in spaced relation to the tank.

2. A milk treating device comprising an inner tank adapted to contain a temperature controlling medium and having a flat base throughout its diameter, a stationary corrugated receptacle within said tank having a funnel portion merging into the lowermost corrugation and an outlet pipe extended from the center of the funnel, means for feeding a liquid into contact with the inner surface of the receptacle at its upper portion, an outer tank having its base in contact with the base of the first mentioned tank, an exteriorly threaded collar into which the outlet pipe is threaded and having a flange engaging the base of the inner tank, and a clamp nut upon said collar engaging the base of the outer tank.

3. In a milk cooler, an outer tank, an inner tank adapted to contain a cooling liquid and having its base in contact with the base of the outer tank, an insulating packing intermediate said tanks, a milk receptacle spaced from the walls of the inner tank and having an outlet extending through the base of both the inner and outer tanks, circulating connections for said inner tank and a clamp carried by said outlet for retaining said tanks and receptacle in detachable contact at their bases.

4. In a milk cooler, an outer tank, an inner tank adapted to contain a cooling liquid and having its base in contact with the base of the outer tank, an insulating packing intermediate said tanks, a milk receptacle spaced from the walls of the inner tank and having an outlet extending through the base of both the inner and outer tanks, a clamp carried by said outlet for retaining said tanks in contact at their bases, and a flange at the upper end of the receptacle and supported by the inner tank to protect the cooling liquid.

In testimony whereof I affix my signature.

CLYDE M. LANCASTER.